United States Patent
Grybos et al.

[11] Patent Number: 5,926,758
[45] Date of Patent: Jul. 20, 1999

[54] RADIO FREQUENCY SHARING METHODS FOR SATELLITE SYSTEMS

[75] Inventors: David P. Grybos, San Jose; James M. Marshall, Sunnyvale, both of Calif.

[73] Assignee: Leo One IP, L.L.C., St Louis, Mo.

[21] Appl. No.: 08/703,228

[22] Filed: Aug. 26, 1996

[51] Int. Cl.$^6$ .................................................. H04B 7/185
[52] U.S. Cl. ..................... 455/429; 455/430; 455/454; 455/13.1
[58] Field of Search ..................................... 455/427, 429, 455/430, 447, 454, 12.1, 13.1, 62, 63, 428

[56] References Cited

U.S. PATENT DOCUMENTS

| | | | |
|---|---|---|---|
| 5,276,908 | 1/1994 | Koohgoli et al. | 455/63 |
| 5,367,304 | 11/1994 | Jan et al. | 455/427 |
| 5,566,354 | 10/1996 | Sehloemer | 455/427 |
| 5,641,134 | 6/1997 | Vatt | 455/428 |
| 5,669,062 | 9/1997 | Olds et al. | 455/12.1 |

FOREIGN PATENT DOCUMENTS

| | | |
|---|---|---|
| 0 546 572 A2 | 6/1993 | European Pat. Off. . |
| 0720308A1 | 7/1996 | European Pat. Off. . |
| WO 96/12356 | 4/1996 | WIPO . |

OTHER PUBLICATIONS

"Sharing Between Main Beam Downlink LEO and UpLink GSO Satellites in the 1–3 Gttz Allocation" by Knudsen et al. Jan. 28, 1991.

"Traffic Modeling and Frequency Resource Management for Mobile Satellite Networks", by Mizuike et al., pp. 147–164, 7–9 Nove 95.

"Frequency Sharing Between Leo System", by M. Cohen et al., published in Alcatel–Espace, Apr. 18, 1993.

*Primary Examiner*—Thanh Cong Le
*Attorney, Agent, or Firm*—Anglin & Giaccherini

[57] ABSTRACT

Methods and apparatus are disclosed which allow many satellites ($A_{1-M}$, $B_{1-N}$) in a plurality of Systems (A, B) to use the same radio frequencies (f1–n) so long as there is no interference between radio signals. The methods compute times (t) when satellite radio signals (32, 36) have overlapping reception areas or "footprints" (30, 35) on the Earth's surface (E) whereby a user's reception or transmission of a message would be interfered unless different frequencies (f1–n) are used for the "competing" signals. The methods use a timing algorithm that does not allow two satellites ($A_i$, $B_i$) which are "visible" at the same point on the Earth (E) to transmit on the same frequency (fi). In one preferred embodiment, a timing algorithm (48) produces a radio frequency use schedule (49) computed on the Earth from orbital data maintained in an ephemeris (46) of satellite communications systems (A, B) which communicate on frequencies (f1–n) giving rise to interfering radio signals. The radio frequency use schedule (49) is updated frequently, and is transmitted to and stored on board each satellite in System A ($A_{1-M}$). System A satellites ($A_{1-M}$) are then operated in accordance with the radio frequency use schedule (49).

11 Claims, 8 Drawing Sheets

RADIO FREQUENCY SHARING METHODS FOR SATELLITE SYSTEMS

CROSS-REFERENCE TO RELATED PATENT APPLICATIONS

The Present Application is related to the following commonly-owned and commonly-assigned Patent Applications:

Polar Relay Method for Satellite System by James R. Stuart, filed on Nov. 9, 1993, and assigned U.S. Ser. No. 08/149,574;

Satellite System Using Equatorial and Polar Orbit Relays by Mark A. Sturza et al., filed on Mar. 28, 1994, and assigned U.S. Ser. No. 08/216,820; and Optimal Coverage Satellite System by Mark A. Sturza et al., filed on Oct. 11, 1994, and assigned U.S. Ser. No. 08/319,819.

FIELD OF THE INVENTION

The present invention relates to the field of satellite communications and telecommunications systems. More particularly, this invention provides methods of frequency sharing for non-geostationary, store-and-forward, satellite communication systems.

BACKGROUND OF THE INVENTION

The Increasing Demand for Telecommunications Services

Over the past few decades, the demand for access to information has increased dramatically. Although conventional wire and fiber landlines, cellular networks and geostationary satellite systems have continued to expand in an attempt to meet this relentless growth in demand, the existing capacity is still not sufficient to meet the burgeoning global appetite for telecommunications services.

Through technology advances and regulatory changes, mobile communication services were offered on a commercial basis and grew to meet city, regional, national and even international coverage needs through interconnection to public networks. As part of this evolution, wireless network standards have developed, on both a national and international basis, although there are still no truly international seamless wireless networks.

The decline in price of mobile services is one of the most important forces helping mobile communications reach broad-based markets and demonstrate rapid subscriber growth. The forces driving development of terrestrial wireless communications include advances in technology, declining prices and digital technology.

The resulting reductions in service and equipment cost attributable to the factors described above have allowed mobile communications to penetrate both business and consumer markets. The ultimate goal of wireless services is to provide two-way, ubiquitous and affordable communications services. It was only very recently, with the introduction of mobile satellite services, that this has been made possible. Indeed, mobile satellite services are the final step in the evolution of wireless communications service and are the only services which can provide this ultimate goal of ubiquitous wireless communication.

Terrestrial-Based Mobile Communications Services

Currently, there are five major types of public mobile communications services used throughout the world:

1. Cellular, which provides primarily two-way, interconnected voice service with mobile, transportable, and portable telephones and providing a platform for data transmission;

2. Paging, which offers primarily one-way data transmission of numeric and alphanumeric messages;

3. Private Radio/SMR, which supplies primarily two-way voice service to closed user groups, but may also provide interconnected and mobile data services. SMR is a subset of private radio where service is provided on a commercial basis to businesses by carriers instead of the businesses owning their own systems.

4. Mobile Data, which provides networks for the exclusive transmission of mobile data; and 5. Personal Communications Services (PCS), which uses microcell technology, includes a wide range of voice and data services, for example, one-way outgoing PCS services, called CT-2, licensed in several countries such as the U.K., Taiwan and the Netherlands.

The growth and evolution of mobile services show that subscribers migrate from basic limited services to more advanced services over time. The growth of terrestrial-based mobile services will increase the awareness and demand for enhanced mobile satellite services. Moreover, mobile satellite services will be able to provide service in areas that cannot be economically served using terrestrial networks.

Wireless Communications

As a result of the advances in technology, privatization, and decreasing prices on a world-wide basis, wireless communications have undergone a rapid increase in subscriber growth in the past several years. The result is that new enhanced wireless services tend to gain market acceptance more rapidly than did earlier wireless technologies. This phenomenon is attributable to the increasing functionality, value relative to price, and awareness among the population of each successive technology. Paging was introduced with only one-way, non-voice communications at a relatively high price. SMR provided two-way communications, but only within a closed user-group. Finally, cellular offered two-way interconnected voice with increasingly wide area coverage. The result of the rapid growth in wireless services worldwide builds an awareness and future demand for the benefits of advanced wireless communications.

Mobile Satellite Services

Mobile satellite services are uniquely positioned to complete the evolution of wireless services. These services offer ubiquitous coverage, interconnection with other networks and a variety of services.

Mobile satellites will be able to support both voice and data terminals, depending upon the particular need of the user. In general, however, voice service will be expensive relative to data, due to the greater infrastructure required for voice communications and the generally greater efficiency of data communications.

Several previous efforts to enhance world-wide communications capabilities are briefly described below. Robert R. Newton discloses a Multipurpose Satellite System in his U.S. Pat. No. 3,497,807. Newton describes a system in which "any point on Earth is always within the line of sight of some satellite and any satellite is always within the line of sight of an adjacent satellite in the same orbital plane." See Newton, Column 2, Lines 4–7.

U.S. Pat. No. 4,135,156 by Sanders et al., entitled Satellite Communications System Incorporating Ground Relay Station Through Which Messages Between Terminal Stations Are Routed, contains a description of a "satellite relay communications system" that "includes a ground relay station arranged so that each message from one subscriber to another is relayed by the satellite relay to the ground relay, processed by the ground relay and then transmitted to the second subscriber by way of the satellite relay." See Sanders et al., Abstract, Lines 1–6.

Paul S. Visher disclosed a Satellite Arrangement Providing Effective Use of the Geostationary Orbit in his U.S. Pat. No. 4,375,697. His patent recites a "satellite squadron or cluster formation" which "is disposed in a predetermined location in . . . geostationary orbit . . . " See Visher, Abstract, Lines 1–2.

In their U.S. Pat. No. 5,119,225, Michael Grant et al. explain their Multiple Access Communication System. The inventors describe a system that incorporates "a node spacecraft" in geostationary orbit that works in combination with "several user spacecraft" in low Earth orbit. See Grant et al., Abstract, Lines 1–3.

The references cited above disclose telecommunication systems that include satellites deployed in polar, Equatorial and inclined low Earth orbits (LEO). The systems provide for transmitting a message between two low-power fixed or mobile terminals on the ground through a store-and-forward network. The store-and-forward relay method takes advantage of the geometry of a system which allows the satellites to fly over different parts of the globe frequently. These LEO systems do not provide access to a satellite one hundred per cent of the time. In the most populated areas of the globe, a user may have to wait for many minutes until a satellite flies into view.

A burgeoning population of LEO communication satellites for commercial and military use is projected. Some observers estimate there will be 51 to 56 million users by the year 2002. To fill such a need for low-cost messaging and data communications available radio frequencies are required which may be packed into an already crowded very high frequency (VHF) and ultra high frequency (UHF) spectrum. Such spectrum already has many users.

Current satellite communication systems use different frequencies simultaneously to communicate between many satellites in the same constellation which are "visible" to a user on the Earth's surface. The term "visible" is an analogy which refers to the fact that radio energy at VHF and UHF frequencies travel essentially in line-of-sight directions. To prevent interference between a satellite to or from which a transmission is expected and other satellites in the same system requires that one satellite transmit and receive at a different frequency. Often the same frequency is used only for satellites in different orbital positions. This is so-called space division multiple access (SDMA). Interference among multiple satellites "visible" at the same point on the Earth may also be prevented by operating different signals at different polarization, or by use of orthogonal spread-spectrum codes. Time division multiple access (TDMA) is a further method of preventing satellites in a particular constellation from interfering with communications by others in the same constellation. The same frequency may be employed by different satellites with overlapping radio beams, but only at different times.

It would be a significant commercial advantage for a new system using a number of satellites to offer a user virtually immediate access to a satellite without interference. It would also be a commercial advantage, in some cases, to offer nearly instant, interference-free communication of the user's message to certain destinations. However, operation of numbers of new constellations of satellites presents a serious problem in that old constellations have been built and launched with little or no means of modifying their patterns of protection from communication interference.

The development of a system which would reduce or obviate interference between satellites of a new constellation and satellites of an already exiting constellation would constitute a major technological advance and would satisfy a long felt need in the satellite and telecommunications industries.

SUMMARY OF THE INVENTION

One of the embodiments of the present invention supports a novel satellite, non-voice, non-geosynchronous communication system that includes a constellation of forty-eight satellites equally deployed in four pairs of low Earth orbits. These orbits are inclined at 50 degrees to the Equator. The satellites orbit in approximately orthogonal planes. A satellite leaves the Equator in one plane on an ascending node while a satellite in the orthogonal plane leaves the Equator on a descending node. The present invention, however, is not limited to such a constellation and is equally applicable to larger or smaller constellations. It is applicable to satellites in polar, inclined, or Equatorial orbits and circular, elliptical with varying foci, or highly elliptical orbits such as the Molnya orbit. The invention is independent of the type of communication service offered. The invention may be employed whenever the radio beams of one satellite in a constellation overlap those of another satellite in the same or in a different constellation. While this invention may be used for interference protection by satellites in geosynchronous (including geostationary) orbits, it is primarily concerned with preventing radio frequency interference (RFI) by new constellations of satellites in non-geosynchronous orbits with satellites in existing constellations.

For communication systems such as the forty-eight satellite constellation mentioned above, user terminals located between 34 degrees and 54 degrees latitude, the most highly populated portion of the globe, have virtually continuous access to a satellite. A preferred method of communication provides a system for transmitting a message between two terminals on the ground through a store-and-forward network. For certain user terminals located in the upper latitudes, communication may be virtually instantaneous unless there are interfering signals from other satellites in different services which could block or cause retransmission of the message.

The present invention will allow two or more satellite systems to utilize the same band of radio frequencies for communication between ground stations and satellites. This is accomplished by timing transmissions of each satellite in one constellation on one frequency or sets of frequencies so the transmissions visible at a point on the Earth do not occur simultaneously with transmissions by a satellite in a second constellation visible at the same point on the Earth on the same frequencies.

In the following discussion, a first satellite constellation, newly launched, will be referred to as "System A" and a second, existing satellite constellation will be referred to as "System B".

To avoid having more than one satellite "visible" to a ground relay station, radio frequencies of System A satellites are allocated so that overlapping visibility contours are not assigned the same frequency. "Visible" refers to the fact that transmissions very high frequency (VHF) or ultra high frequency (UHF) are essentially line of sight. Timing of transmissions by a satellite residing in System A is determined with reference to calculations of the ground visibility contours (radio beam footprints) of all of the satellites in System A and in those of satellites residing in System B and others if necessary.

An ephemeris data set is constructed including orbital parameter data of all of the satellites in System A and System B. The orbital parameter data includes a continuous description of the position of the radio beam footprints with time for each satellite. It also may include the operating radio frequencies assigned for each satellite in System B.

A radio frequency use schedule is then constructed using a radio frequency use schedule algorithm in a conventional central processing unit (CPU). The algorithm is used to implement a frequency avoidance plan. The algorithm determines mutual visibility of a System A satellites and a System B satellites by a terminal on the Earth by calculating the distance between satellites based on the orbital data ephemeris. The algorithm determines which satellite in the System B is impacted by a satellite in System A. Only a satellite in System A which impacts another satellite is required to change frequency.

The radio frequency use schedule is frequently updated to correct for satellite drift and other changes in satellite constellation topology. The radio frequency use schedule is periodically communicated by a ground relay station-to-satellite uplink to each satellite in System A where it is stored on board. Each satellite is then operated in accordance with the radio frequency use schedule. Frequency changes are made to avoid interfering with other satellites in the System A or System B.

A preferred radio frequency use schedule algorithm that minimizes (or prohibits) System A satellites from causing interference to System B satellites also minimizes the system outages of System A. System A outages can be caused at times when no unused frequencies are available. Different frequencies are assigned to System A satellites in each orbit plane. Frequencies at the low end and high end of the frequency bands are interleaved to minimize the number of satellites that must change frequency for any overlapping footprint conflict. Any required frequency change is made by changing to the frequency assignment of a satellite in the first constellation to a frequency assigned in an "orthogonal" orbit plane. If such a frequency is unavailable, then any available frequency is chosen.

In one preferred embodiment, the method described above is used with packet transmission store and forward protocols so that infrequent interference between satellites in the System A can be tolerated due to minimal degradation caused by burst packet transmissions and packet re-transmissions.

In another, alternative embodiment, timing of the transmissions and frequency assignments is based on a satellite in System A detecting the use of a frequency by a satellite in System B and relaying that information between satellites in System A. To avoid transmission on the same frequency by the two constellations requires all satellites in System A to detect transmissions in their field of view and change their transmitting frequency to a non-interfering frequency based on the frequency use information relayed between satellites in System A. In this embodiment, the radio frequency reuse schedule is computed on board each satellite based on the known position and frequencies of other satellites which is periodically furnished from a ground station.

An appreciation of other aims and objectives of the present invention and a more complete and comprehensive understanding of this invention may be achieved by studying the following description of preferred and alternative embodiments and by referring to the accompanying drawings.

A BRIEF DESCRIPTION OF THE DRAWINGS

FIG. 1 is a schematic view of a constellation of forty-eight satellites in four pairs of inclined orbits. For the sake of clarity, only two pairs of orbits are shown.

FIG. 2a is a diagram showing how a satellite (A1) residing in a first constellation (System A) can transmit radio signals which, unless on a different frequency, can interfere with radio signals from another satellite (B1) residing in a second constellation (System B) when the two satellites are visible to a ground station. Satellite A2 may transmit on the same frequency as satellite B1 because of the spatial separation of the two satellites.

FIG. 2b is a diagram which depicts a satellite in System A which has a radio beam footprint overlapping the footprints of two satellites in System B which may be operating on the same frequency because of spatial separation. Simultaneously transmitted radio signals to and from the System A satellite will interfere with the signals to and from the System B satellites in the overlapping regions of the footprints.

Figure 9:
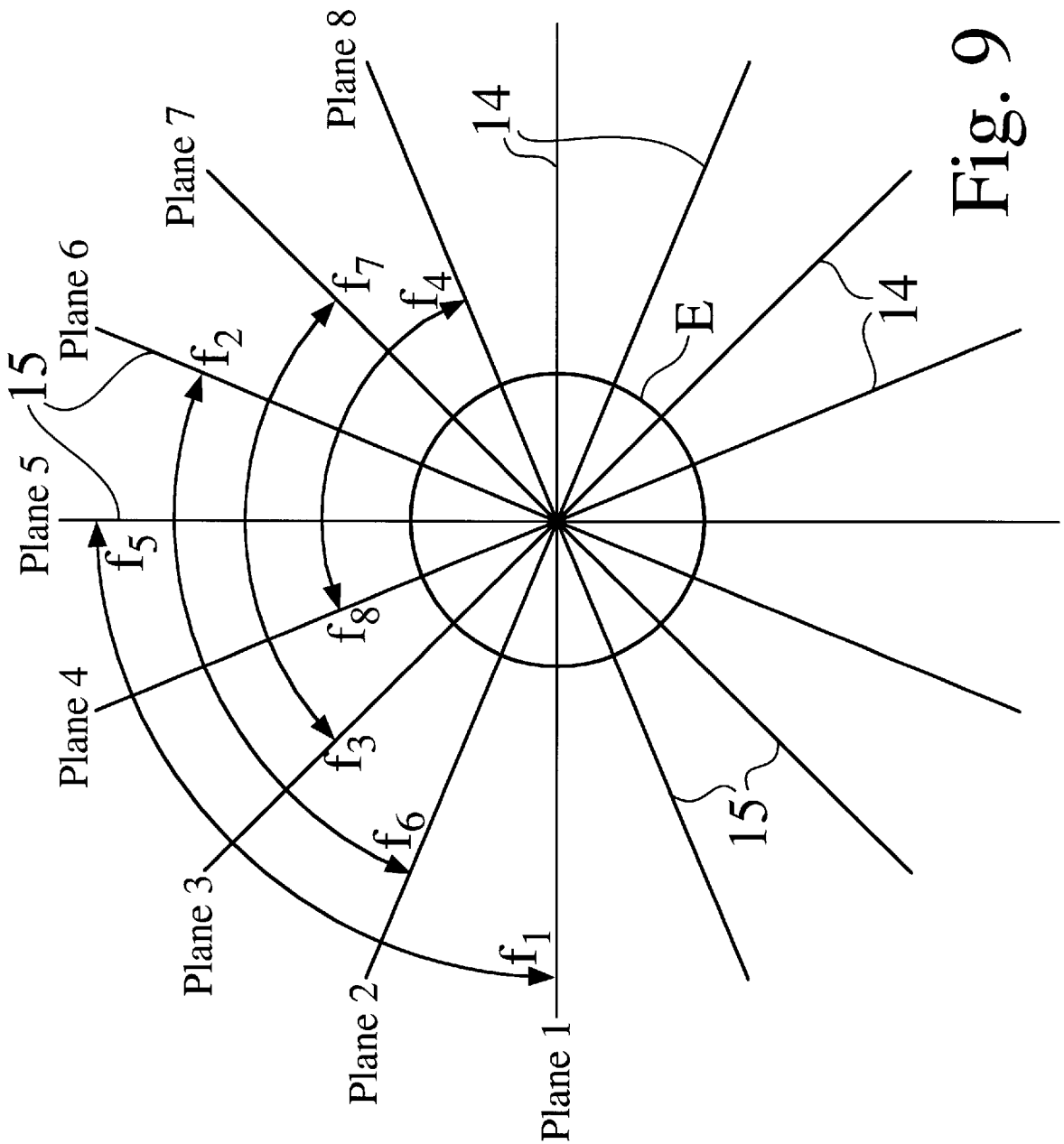

FIG. 9 reveals a diagram of the Earth and the orbital planes of System A satellites as seen from one pole, showing a plan for pairing frequency assignments among satellites in orthogonal orbital planes which minimizes the number of satellites in System A that must change frequency when a potential interference is caused by overlapping of System A radio-beam footprints by satellites of System B.

Figure 10:
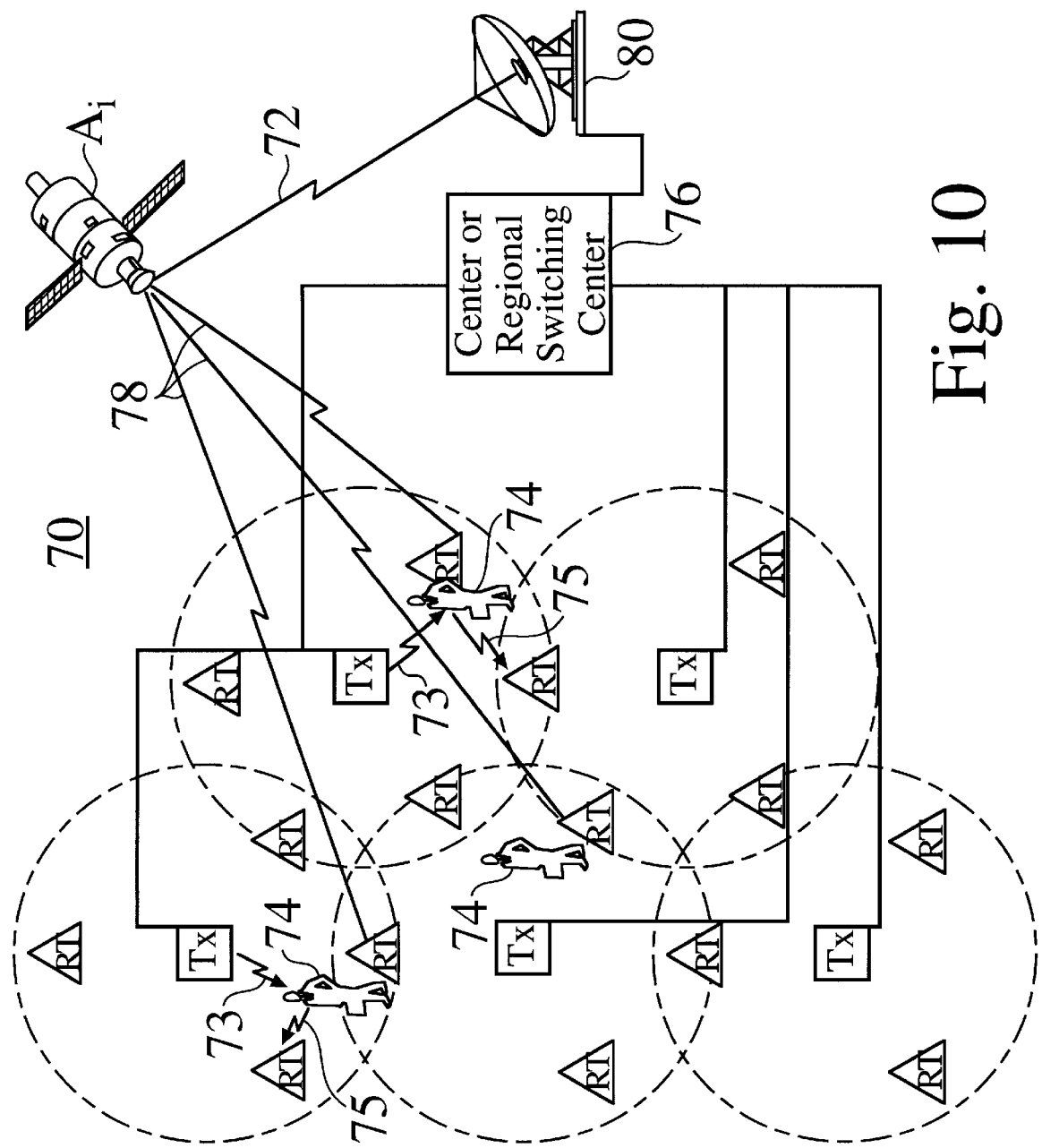

FIG. 10 represents a terrestrial two-way wireless (radio) communications system which reuses frequencies on a cellular basis and uses LEO or MEO satellite links to connect remote receiver stations to a central or regional switching center which is in turn connected to higher power service transmitters.

A DETAILED DESCRIPTION OF PREFERRED & ALTERNATIVE EMBODIMENTS

A System of Satellites

Figure 1:
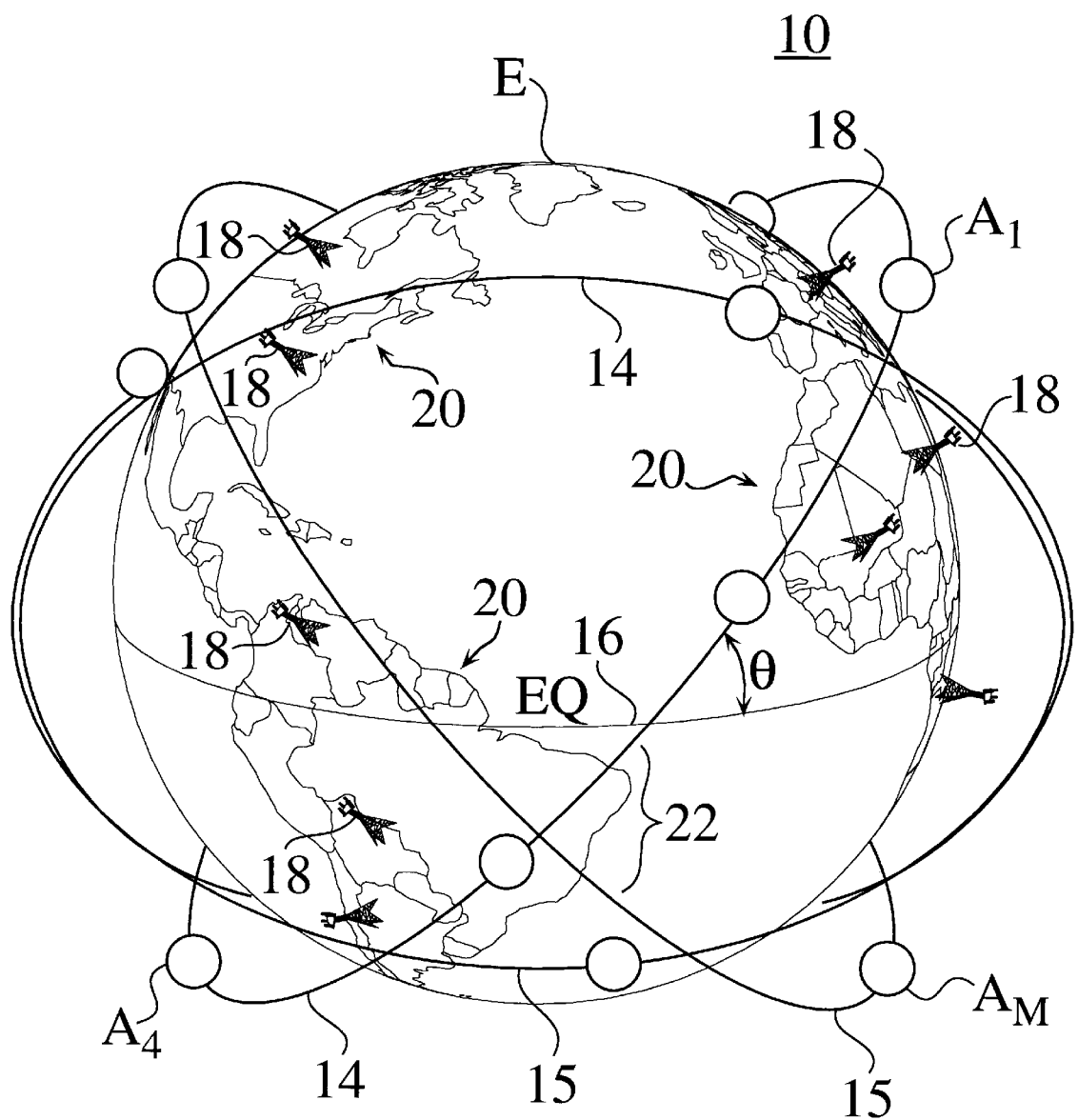

FIG. 1 is a schematic view of a constellation 10 of forty-eight satellites (A1-M) operating in four conjugate pairs of orbits 22 supported by a preferred embodiment of the present invention. For the sake of clarity, only two conjugate pairs of orbits 22 are shown. In the text that follows, the term "constellation" refers to the entire group of satellites. A complete implementation of the invention which incorporates the constellation 10 as well as equipment such as relay stations 18 or user terminals 20 on or near the surface of the Earth E is described by the term "system". In the following discussion, a first satellite constellation 10, newly launched, will be referred to as "System A" and a second, existing satellite constellation will be referred to as "System B".

The satellites 12 shown in FIG. 1 operate in one preferred embodiment, in a circular orbit 14, 15 about the Earth E, which is inclined at 50 degrees to the Earth's Equator 16. In one preferred embodiment, the satellites (A1-M) are equally spaced in orthogonal pairs of orbits 22 at an altitude of 950 km. The pairs of orbits 22 are positioned so that the ascending node of one orbit 14 is displaced 180 degrees in right ascension (longitude) from the ascending node of the orthogonal, conjugate orbit 15. The ascending node of one orbit 14 must therefore occur at the same angle of right ascension as does the descending node of the orthogonal, conjugate orbit 15. Ascending nodes of adjacent orbital planes are placed at 0, 45, 90, 135, 180, 225, 270 and 315 degrees right ascension. The interplane phase angle between any two adjacent orbital planes in one embodiment is zero degrees. In another embodiment, the interplane phase angle is 7.5 degrees. The interplane phase angle is the angle between two satellites A1, AM in adjacent planes when one satellite is at the Equator 16.

The relay stations 18 are located on the ground and distributed internationally in a pattern of locations on the Earth which maximize coverage and minimize time to forward messages and data between any two user terminals. In a preferred embodiment of the System A, there are approximately ten to one hundred "distributed" relay stations 18. The relay stations 18 are capable of communicating with the satellites A1-M in orbit via uplinks and downlinks. The relay stations 18 may be connected to terrestrial based networks such as public telephone networks.

User terminals 20 are randomly distributed over the Earth's surface and are also capable of communicating with the satellites A1-M. The user terminals 20 may be fixed, mobile or portable. They may be located on land, at sea or in the air.

The parameters given above are for a preferred embodiment of a System A of communication satellites A1-M used in the invention. It will be appreciated by those skilled in the art that the methods and apparatus described are equally applicable to larger or smaller constellations. It is applicable to satellites in polar, inclined, or Equatorial orbits and circular, elliptical with varying foci or highly elliptical orbits such as the Molnya orbit. The invention is independent of the type of communication service offered. Use of the invention is desirable whenever the radio beams of one satellite in a System A overlap those of another satellite in the same or in a different System B. While this invention may be used for interference protection by satellites in geosynchronous (including geostationary) orbits, it is primarily concerned with preventing radio frequency interference (RFI) by new constellations of satellites A1-M in non-geosynchronous orbits with satellites B1-N in existing systems. For example, the altitude of the satellites may be other than 950 km so long as it is greater than 100 km and substantially less than geostationary altitude. The altitudes of satellites in differing orbits may be different. The inclination of the orbit planes 14, 15 may vary from 0 degrees to 180 degrees and the inclination of a plane may differ from other planes. The interplane phase angle between satellites in adjacent orbits may vary between 0 degrees and 360 degrees and may be different between adjacent orbit planes. Further, the number of satellites per orbital plane 14, 15 may be a positive integer, and the total number of satellites is given by the number of orbital planes 14, 15 multiplied by the number of satellites per plane. A constellation 10 may be created in which the number of orbital planes (N) is an even, positive integer and the ascending nodes of the planes are positioned at right ascension angles of 0, 180, 360/N, 360/N+180, . . . ,k*360/N, k*360/N+180, . . . ,(N/2−1)*360/N, (N/2−1)*360/N+180 degrees.

Telecommunication Frequencies and Spectrum

The present invention has been designed from the outset to make efficient use of the scarce spectrum available. As an example of this scarcity, Table One below summarizes the total spectrum available in the U.S. for a typical non-voice non-geosynchronous (NVNG) type of service, resulting from the allocations made at WARC-92 and in the Federal Communication Commission's Order allocating spectrum for the NVNG Mobile Satellite Systems.

TABLE ONE

Mobile Satellite System Frequency Allocations Below 1 GHz

| Earth-to-Space | Space-to-Earth |
|---|---|
| 148.000 to 150.050 MHz | 137.000 to 138.000 MHz |
| 399.900 to 400.050 MHz | 400.150 to 401.000 MHz |

The table shows a total of 2.2 MHz available for the Earth-to-space links (uplink) and 1.85 MHz for the space-to-Earth links (downlink). However, parts of this available spectrum are only allocated on a secondary basis to the MSS service, and even the primary MSS allocations are allocated on a co-primary basis to other services, such as Fixed, Mobile, Meteorological-Satellite, Space Operation, Space Research and Meteorological Aids. The ability of the system to effectively and efficiently share the spectrum in this type of environment is therefore of paramount importance.

Radio Frequency Interference Between Satellite Systems

Figure 2A:
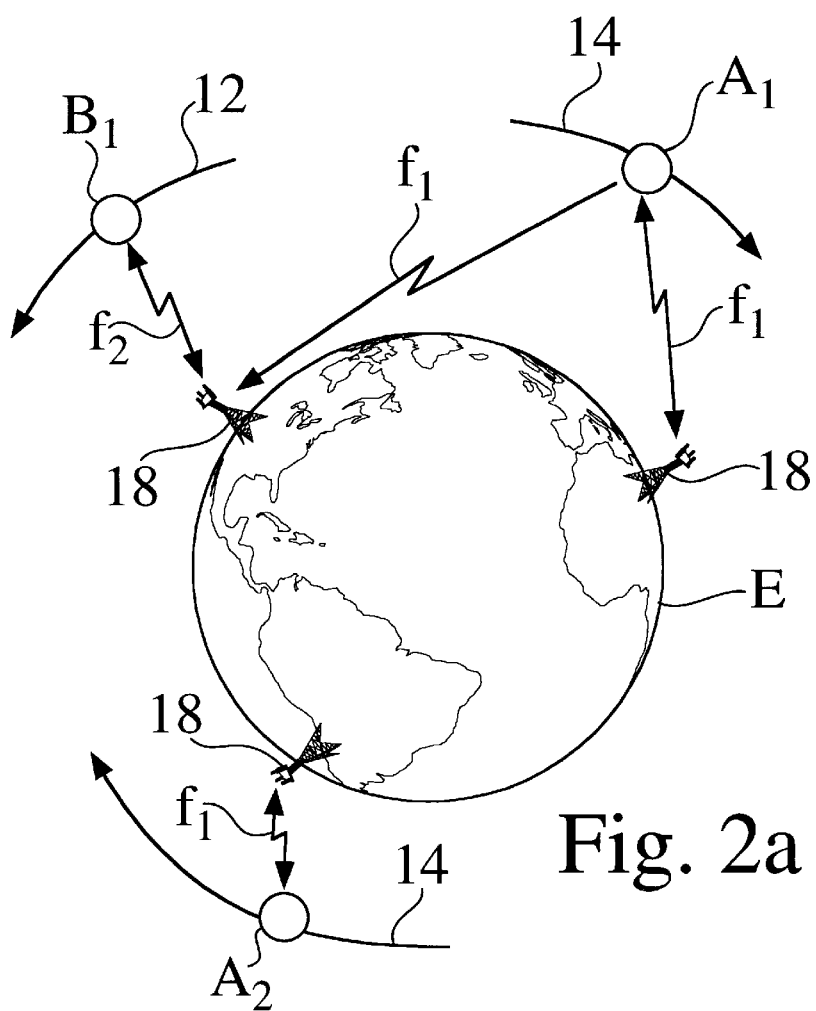

FIG. 2a is a diagram showing how a satellite A1 residing in a first constellation (System A) can transmit radio signals which unless on a different frequency, can interfere with radio signals from another satellite B1 residing in a second constellation (System B). Satellite B1 is flying in orbit 12. Satellites A1 and A2 are positioned in different orbits from the one satellite B1 is flying in. In its current position, satellite A1 is visible to the same terrestrial relay station 18 or user terminal 20 as is visible to satellite B1. "Visible" refers to the fact that transmissions at very high frequency (VHF) or ultra high frequency (UHF) and above are essentially line of sight. The two satellites A1, B1 are visible to the ground relay station 18 or user terminal 20 nearest satellite B1 in this figure. In its current position, satellite A2 is not visible to the same terrestrial relay station 18 or user terminal 20 as is either satellite A1 or satellite B1. Therefore, at their present positions, satellite A1 may not simultaneously transmit signals on the same frequency f2 as satellite B since the signal from satellite A1 will interfere with that of satellite B1 at the terrestrial relay station 18 or user terminal 20 nearest satellite B1. Satellite A1 may transmit on the same frequency f1 as satellite A2 because the spatial separation of the two satellites prevents interference between the two signals at the terrestrial station 18 or user terminal 20. Satellite A2 may also transmit simultaneously with satellite B1 on frequency f2 because the spatial separation of the two satellites A2, B1 prevents interference between the two signals at the terrestrial station 18 nearest satellite B1.

Figure 2B:
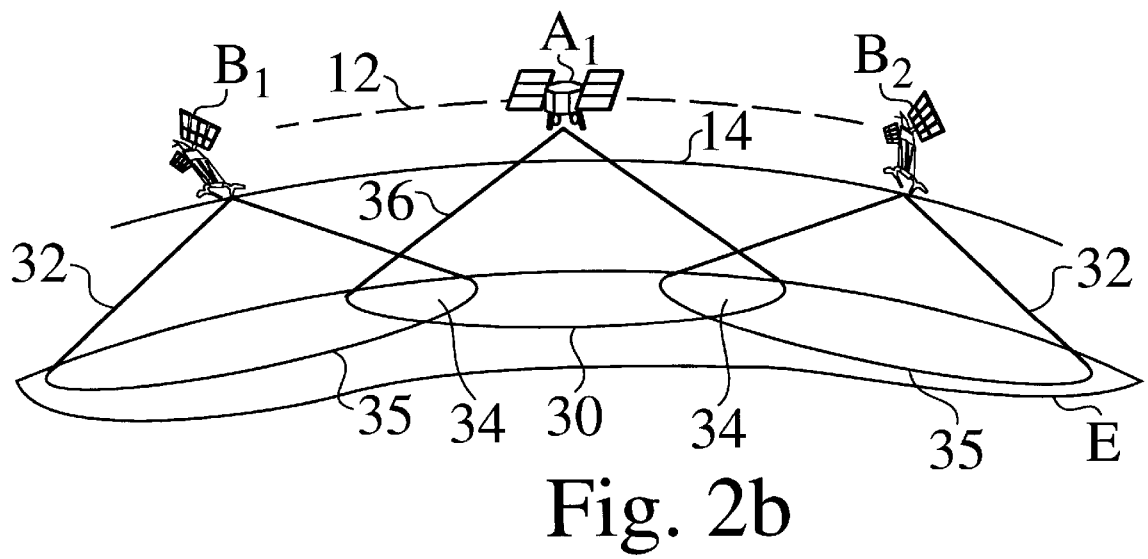

FIG. 2b is a diagram which depicts a satellite in System A which has a radio beam footprint 30 overlapping the footprint 35 of each of two System B satellites B1, B2. Satellites B1 and B2 may be operating on the same frequency because spatial separation permits them to do so. Radio beams 36 to and from System A satellite A1 in the overlapping regions 34 of the footprints 30, 35 will interfere with the signals to and from the System B satellites B1, B2 if simultaneously transmitted. Satellite A1 must therefore operate at a frequency different from that used by satellites B1 or B2 to avoid interfering with any System B users within the overlapping regions 34.

Figure 3:
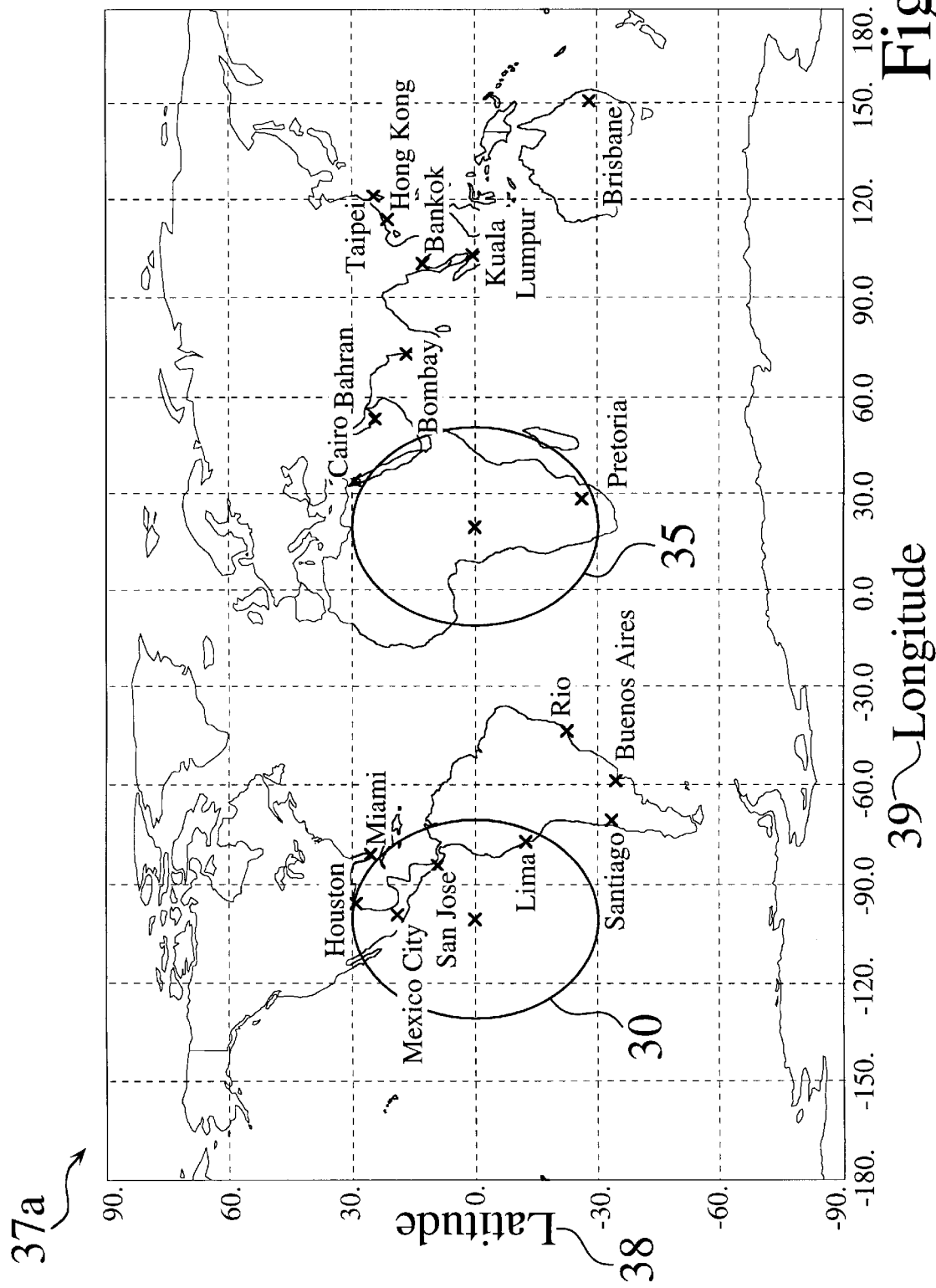
FIG. 3 is a Mercator projection of the Earth's surface showing two satellites in different constellations whose radio beam footprints do not overlap. Interference is avoided if both satellites operate simultaneously on the same radio frequency.

FIG. 3 is a Mercator projection 37a of the Earth's surface showing radio beam footprints 30, 35 of two satellites A1, B1 in different Systems A, B which at their present positions do not overlap and hence there is no interference if both satellites operate simultaneously on the same radio frequency f1. However, as the satellites move in their orbits, there may come a time when the radio beam footprints 30, 35 overlap and one satellite must operate on a different frequency in order to prevent interference between simultaneous signals to or from the two satellites A1, B1 as shown in FIG. 2b.

Figure 4:
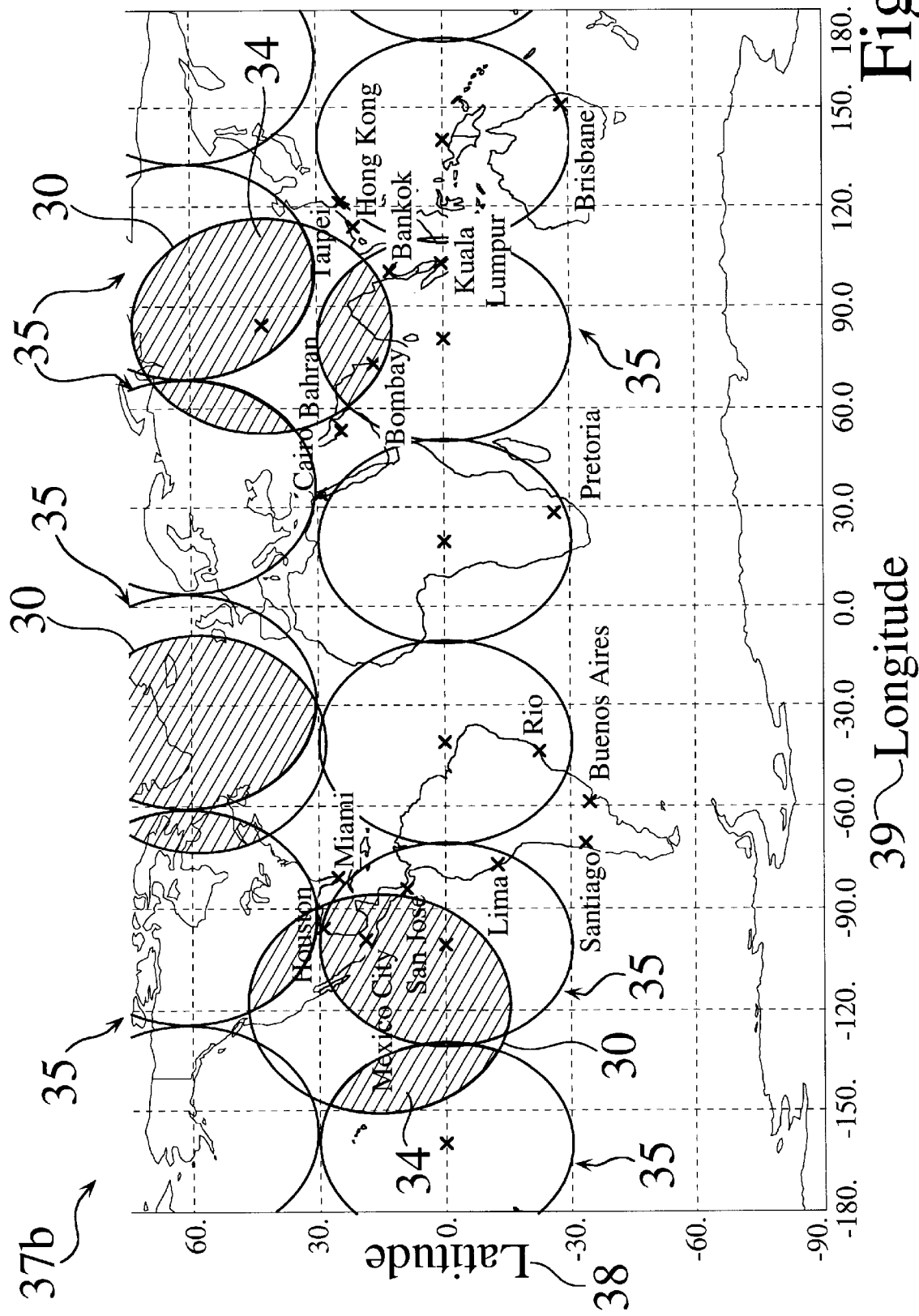
FIG. 4 is a Mercator projection of the Earth's surface showing a plurality of satellites in two different constellations whose radio beam footprints overlap in the shaded areas, potentially causing radio frequency interference (RFI) between the two systems. For clarity, the diagram shows only radio beam footprints for satellites on or North of the Earth's Equator.

FIG. 4 is a Mercator projection 37b of the Earth's surface showing a plurality of satellites in two different Systems A, B whose radio beam footprints 30, 35 overlap in the shaded areas 34. For clarity, the projection has been limited to satellites having footprints 30, 35 between latitudes 38 of sixty degrees North and thirty degrees South. There is potential radio frequency interference (RFI) in the overlapping (shaded) areas 34, if simultaneous transmissions on the same frequencies (fi) are made by satellites whose footprints 30, 35 overlap.

For certain user terminals 20 located in the these upper latitudes, communication may be virtually instantaneous unless there are interfering signals from other satellites (B1-N) which could block or cause retransmission of the message. Therefore, elimination of this interference will greatly enhance the efficiency of both systems, thereby greatly improving the services for users.

Figure 5:
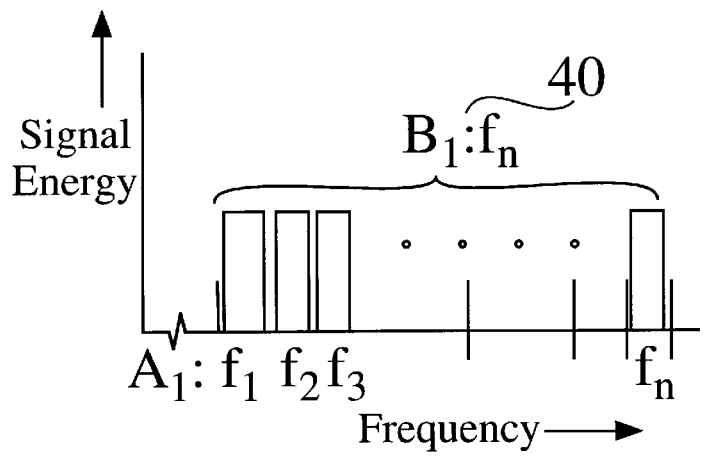
FIGS. 5 and 6 are charts of signal energy versus frequency for communication signals used by satellites in System A ($f_{A11} \ldots F_{Anm}$) which occupy the same frequency bands as signals used by satellites in System B ($f_{B1} \ldots f_{Bn}$) showing how the signal frequencies are shared.
Figure 6:
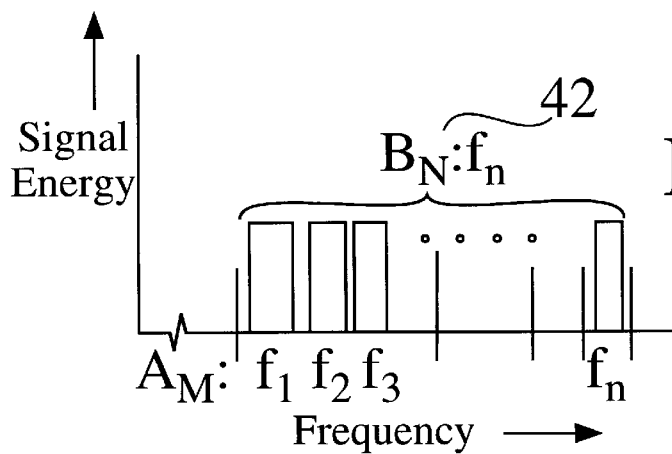

FIG. 5 is a chart of signal energy versus frequency for communication signals usable by satellites in System A ($f_{A11} \ldots f_{A1n}$) which occupy the first frequency band used by satellites in System B ($f_{B1}$). FIG. 6 is a chart of signal energy versus frequency for communication signals used by the satellites in System A ($fA_{m1} \ldots F_{Amn}$) which occupy the mth band used by satellites in System B ($f_{Bmn}$). Satellites in System B operate using frequency bands $f_{B1} \ldots f_{Bm}$. Satellites in System A operate using frequency bands $f_{A11} \ldots f_{Anm}$. These charts depict graphically how the limited signal frequencies available are shared by satellites in System A and System B.

To avoid having more than one satellite "visible" to a ground relay station 18, radio frequencies of System A satellites are allocated so that overlapping visibility contours are not assigned the same frequency. Timing of transmissions by a satellite residing in System A is determined with reference to calculations of the ground visibility contours (radio beam footprints) of all of the satellites in System A and in those of satellites residing in System B and others if necessary.

Radio Frequency Sharing Methods for Satellite Systems

The present invention will allow two or more satellite Systems A, B to utilize the same band of radio frequencies for communication between ground stations 18, 20 and satellites A1-M, B1-N. The invention prevents or minimizes interference between the satellite radio signals at terrestrial terminals 18, 20 which are in the overlap area 34 of radio beams 32, 36 of two satellites of different systems A, B or of the same System A directly served by the invention. This is accomplished when the available frequencies are shared and when the satellite footprints 30, 35 overlap, by timing transmissions of each System A satellite A1-M on a frequency fi or sets of frequencies selected from $f_{A11} \ldots f_{Anm}$ so the transmissions do not occur simultaneously with transmissions on identical frequencies by a System B satellite B1-N within any overlapping regions 34.

Figure 7:
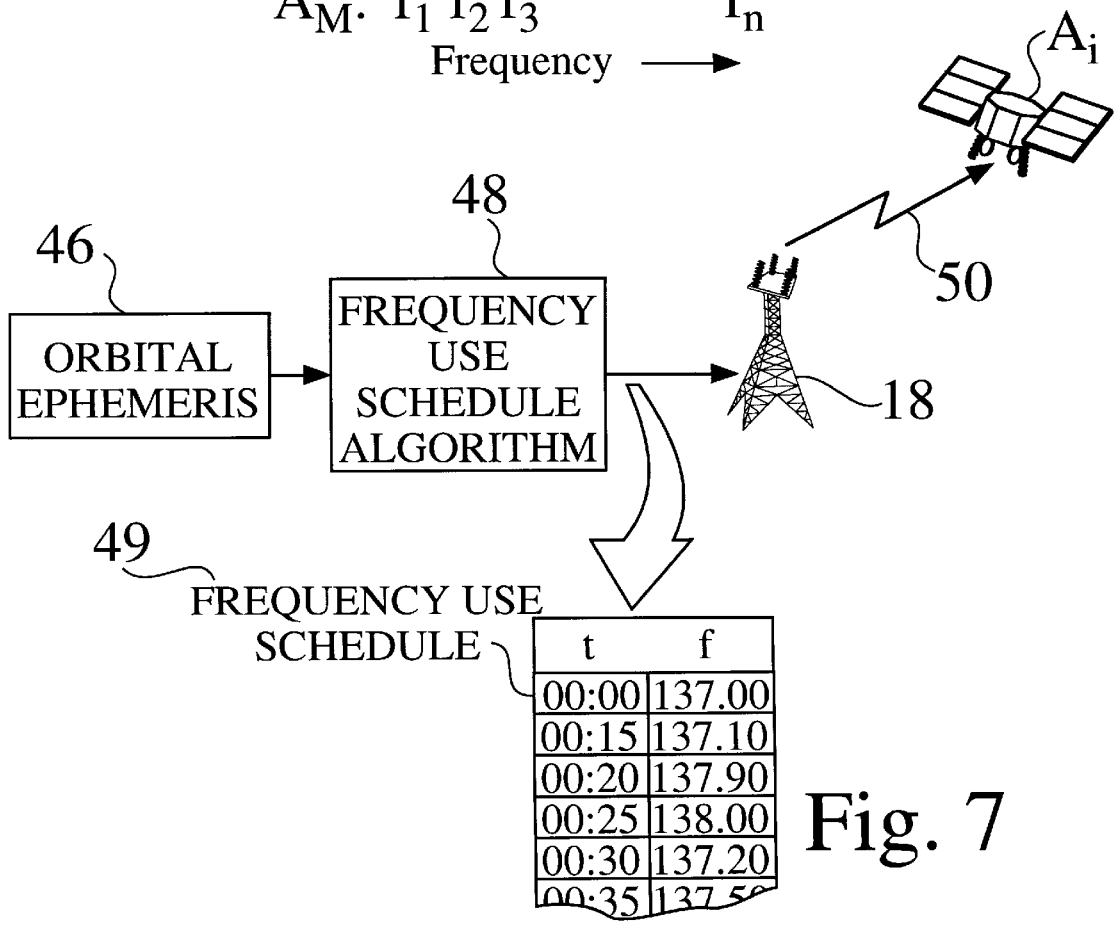
FIG. 7 is a schematic diagram of a preferred embodiment of the Radio Frequency Sharing for Satellite Systems depicting how orbital ephemeris data is used to create a radio frequency use schedule which is transmitted from a ground relay station via uplink to a System A satellite for use in timing the transmissions of the System A satellite which would otherwise interfere with System B satellites.

FIG. 7 is a schematic diagram of a preferred embodiment of the Radio Frequency Sharing Methods for Satellite Systems. It depicts how orbital ephemeris data 46 is used to create a radio frequency use schedule 49 which is transmitted from a ground relay station 18 via uplink to a satellite for use in timing transmissions of the System A satellite Ai which would otherwise interfere with one or more System B satellites.

Orbital data and radio frequency assignments for satellites A1-M in System A and satellites B1-N in other Systems B, are collected in the orbital data ephemeris 46. The position of satellite footprints 30, 35 and the distances between them are computed and continually updated. This data is used by a radio frequency use schedule algorithm 48 to produce a frequency use schedule 49. Storage of the ephemeris data 46 and computation of the radio frequency use schedule 49 is accomplished by conventional computing means. The radio frequency use schedule 49 is transmitted periodically as necessary to each satellite Ai residing in System A by an uplink 50 from a ground relay station 18.

Figure 8:
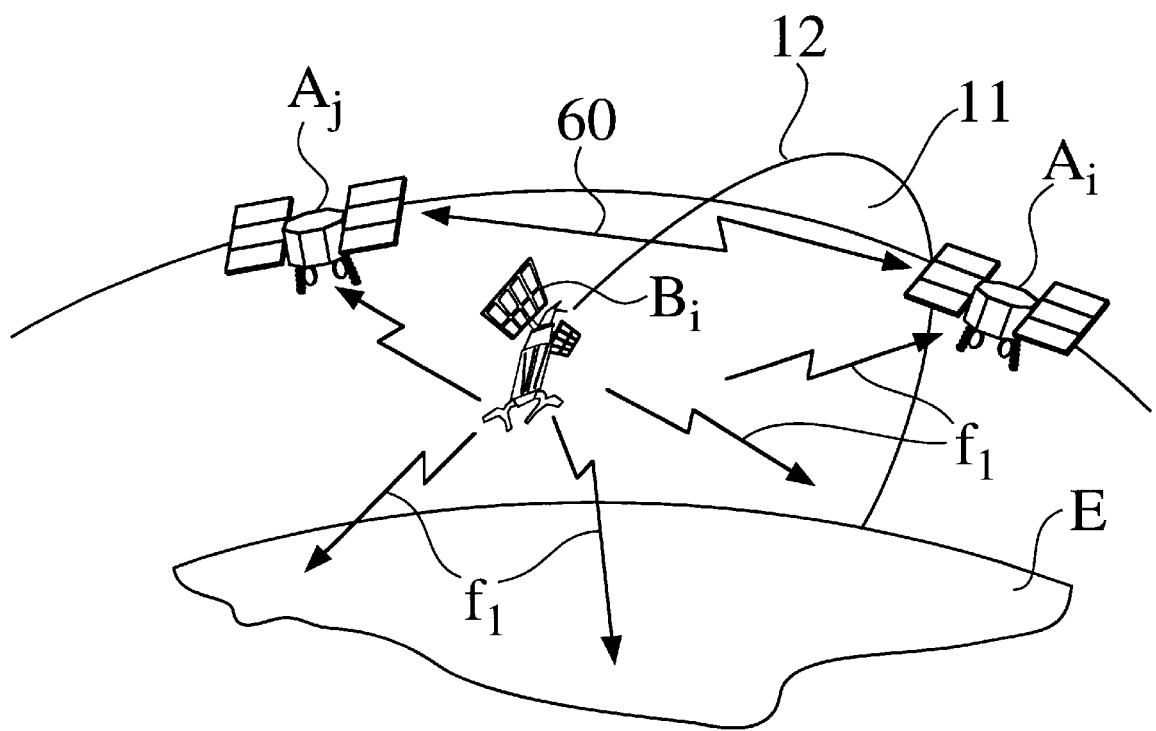
FIG. 8 is a schematic view of System A satellites Ai, Aj using an alternative embodiment of Radio Frequency Sharing for Satellite Systems. Satellites residing in System A listen for transmissions of satellites residing in System B and change frequency to prevent interference.

FIG. 8 is a schematic view of System A satellites using an alternative embodiment of Radio Frequency Sharing Methods for Satellite Systems. Satellites residing in System A listen for transmissions of satellites residing in System B to determine when to change transmission frequency. The frequency intercepted by satellite Ai is sent to all satellites in the system. In this embodiment, the orbital parameter ephemeris 46 is maintained on board each satellite A1-M and the radio frequency use schedule 49 is computed on board the satellites A1-M by use of the radio frequency use schedule algorithm 48. Of course, the ephemeris 46 and algorithm 48 may be also maintained and computed on the Earth in the event cost and power use are to be conserved. In that event, the satellite which intercepts the frequency being used by the System B satellite B1 transmits the information to the nearest ground relay station 18 for processing.

Frequency Assignments and Pairing

A frequency assignment plan for System A satellites A1-M is dependent on the topology of System A. For the system of 48 satellites A1-M in inclined, orthogonal, conjugate orbits 14, 15 described above, a plan for pairing of assigned frequencies f1–n is shown in FIG. 9. This figure reveals a diagram of the Earth E and the orbital planes 14, 15 of System A satellites shown in one preferred embodiment as polar orbits. It shows a plan for pairing frequency assignments among satellites A1-M in orthogonal orbital planes 14, 15. The pairing minimizes the number of satellites A1-M that must change frequency $f_{1-m}$ when a potential interference is caused by overlapping of a System A radio-beam footprint 30 by a footprint 35 of System B satellites B1-N. For the eight planes depicted and eight available frequencies f1–8, the same frequency is assigned to satellites in orthogonal, conjugate planes 14, 15. Thus, for any given time period t, satellites in plane 1 are assigned to frequency f1; alternate satellites in plane 2 are assigned frequencies f2 and f6 respectively; alternate satellites in plane 3 are assigned frequencies f3 and f5; alternate satellites in plane 4 are assigned frequencies f3 and f4; alternate satellites in plane 5 are assigned frequencies f3 and f5; alternate satellites in plane 6 are assigned frequencies f2 and f6; alternate satellites in plane 7 are assigned frequencies f5 and f7; and satellites in plane 8 are assigned frequency f4. In the case of some conflicting satellite systems, such pairing minimizes the probability of a System B overlapping footprint 35 requiring a change in more than two frequencies. As has been noted previously, the radio frequency use algorithm implements such pairings and choices for frequency changes. For a time when an interference is predicted, the algorithm will require a frequency change to that of an orthogonal plane. If a selected frequency is unavailable then any available frequency is selected. At least one frequency is always available.

A Method for Facilitating the Deployment of Nationwide Two-Way Paging Networks

FIG. 10 represents a terrestrial two-way wireless (radio) communications system 70 which reuses frequencies on a cellular basis and uses LEO or MEO satellite links 72, 78 to connect remote receiver stations RT to a central or regional switching center 76 which is in turn connected to higher power service transmitters Tx. The system uses fixed location service transmitters Tx to transmit signals 73 toward lower power mobile or portable subscriber units 74. Within the service area of a transmitter Tx, the subscriber units 74 are able to receive signals 73 from the higher powered fixed location service transmitter Tx but they do not have enough power to transmit back to the fixed location service transmitter Tx. Satellite transceivers RT are deployed around the fixed location service transmitters Tx to pick up the low power signals 75 from the subscriber units 74 and relay the signal 78 to a central or regional switching center 76. The central or regional switching center is then able to complete a two way path for communications (for example, through the public switched telephone system) and is able to determine the general location of the subscriber unit 74 for the purpose of optimizing network traffic and service quality.

The switching center 76 communicates to the Satellite Ai through link 72 via the switching center antenna 80. The transceivers RT are coupled to the switching center 76 through links 78 to the satellite Ai and from the satellite Ai through link 72.

CONCLUSION

Although the present invention has been described in detail with reference to a particular preferred embodiment and alternative embodiment, persons possessing ordinary skill in the art to which this invention pertains will appreciate that various modifications and enhancements may be made without departing from the spirit and scope of the claims that follow. The various orbital parameters, altitudes and constellation populations, locations of the user terminals 20 and relay stations 18 and frequency avoidance plans implemented by the frequency use schedule algorithm 48 that have been disclosed above are intended to educate the reader about preferred embodiments, and are not intended to constrain the limits of the invention or the scope of the claims. The List of Reference Characters which follows is intended to provide the reader with a convenient means of identifying elements of the invention in the Specification and Drawings. This list is not intended to delineate or narrow the scope of the claims.

LIST OF REFERENCE CHARACTERS

FIGS. 1 through 9

10 Constellation or System "A" of satellites
12 Orbit of constellation or System "B" satellites
14 Orbital plane of System "A" satellites
15 Orthogonal orbital plane of System "A" satellites
16 Equator
18 Ground relay station
20 Distributed user terminals
22 Orthogonal pairs of satellite orbits
30 Footprint of radio beam from A constellation satellite
32 Radio beam from B constellation satellite
34 Overlap of footprints of radio beams from A and B System satellites
35 Footprint of radio beam from System B satellite
36 Radio beam from System A satellite
37a Mercator projection of the Earth and footprints of one System A satellite and one System B satellite
37b Mercator projection of the Earth and footprints of a plurality of System A satellites overlapping a plurality of footprints of System B satellites
38 Latitude Scale of Mercator projection of the globe
39 Longitude scale of Mercator projection of the globe
40 Radio frequency spectrum used by a System B first satellite
42 Radio frequency spectrum used by a System B Nth satellite
46 Orbital ephemeris electronic data table
48 Radio frequency use schedule algorithm computation
49 Computed frequency-use schedule electronic data
50 Ground relay station-to-satellite uplink
60 Intersatellite radio link
70 Terrestrial two-way wireless system
72 LEO/MEO satellite-to-switching center link
73 Service transmitter high-power signal
74 Subscriber unit
75 Subscriber unit low-power signal
76 Central or regional switching center
78 Remote transceiver-to-satellite link
80 Switching center antenna
A1 First satellite in System A constellation
A2 Second satellite in System A constellation
A$_M$ Last satellite in System A constellation
Ai ith satellite in System A constellation
Aj jth satellite in System A constellation
$f_{Akl}$ Radio frequencies used by System A satellites: k=1 . . . n; l=1 . . . m
$f_{Bp}$ Radio frequencies used by System B satellites: p=1 . . . n
B1 First satellite in System B constellation
B2 Second satellite in System B constellation
Bi ith satellite in System B constellation
B$_N$ Last satellite in System B constellation
E Earth
EQ Equator
fi ith frequency used by satellites
t Time period for frequency use
m Number of frequency bands used by System A
n Number of frequency bands used by System B
RT Remote transceiver
Tx Fixed location service transmitter.

What is claimed is:

1. A method of radio frequency sharing between satellites (A1-M) in a first System (A) and satellites (B1-N) in a second System (B), said satellites of said first System (A) being in communication with Earth (E) through a plurality of ground relay stations (18) and user terminals (20), said first System (A) having a plurality of orbit planes (14, 15) containing said satellites (A1-M), the method comprising the steps of:

assigning an initial communication frequency to all said satellites (A1-M) in each one of said plurality of orbit planes (14, 15) of said first System (A); said initial communication frequency being identical for all satellites (A1-M) residing in a same orbital plane (14, 15);

changing said initial communication frequency ($f_{Ai}$) assigned to one of said satellites (Ai) residing in a first one of said orbital planes (14) of said first System (A), to a frequency ($f_{Aj}$) assigned to satellites (Aj) residing in a second one of said orbital planes (15) of said first System (A), when a radio beam footprint (30) of said satellite (Ai) overlaps a radio beam footprint (35) of one of said satellites (B1-N) residing in said second System (B) and said radio frequencies being in use by respective said satellites (A1-M, B1-N) will interfere; said frequency ($f_{Aj}$) being one which does not interfere with any other satellite (A1-M) in said first System (A) or a satellite (B1-N) in said second System (B), and effecting timing of said changing said initial communication frequency ($f_{Ai}$) by using a radio frequency use schedule (49) computed in advance from orbital parameter ephemeris data (46) for said satellites (A1-M) in said first System (A) and satellites (B1-N) in said second System (B).

2. The method as claimed in claim 1, in which the step of changing said initial communication frequency ($f_{Ai}$) assigned to one of said satellites (Ai) residing in a first one of said orbital planes (14) of said first System (A), includes the step of changing said initial communication frequency ($f_{Ai}$) to a frequency ($f_{Aj}$) initially assigned to satellites (Aj) residing in orbit planes (14, 15) in which said satellites (Aj) do not present radio interference with satellites (A1-M) in other said planes (14, 15).

3. The method as claimed in claim 1, in which the step of assigning an initial communication frequency to all said satellites (A1-M) in each one of said plurality of orbit planes (14, 15) of said first System (A) further includes the step of:

assigning said initial communication frequency ($f_{Ai}$) by interleaving the frequency assignments to each of the orbital planes (14, 15) of said first System (A) such that every odd numbered orbit plane is assigned a frequency from a first half of an authorized frequency spectrum and every even numbered orbit plane is assigned a frequency from a second half of the spectrum.

4. The method as claimed in claim 3, in which the step of assigning said initial communication frequency ($f_{Ai}$) by interleaving the frequency assignments to each of the orbital planes (14, 15) of said first System (A) includes the step of:

assigning said frequency from said first half of an authorized frequency spectrum in an order proceeding from a lower frequency (f1) to a higher frequency (f7) and assigning said frequency from said second half of an authorized frequency spectrum in an order proceeding from a higher frequency (f6) to a lower frequency (f2).

5. The method as claimed in claim 3, in which the step of changing said initial communication frequency ($f_{Ai}$) assigned to one of said satellites (Ai) residing in a first one of said orbital planes (14) of said first System (A), includes the step of changing said initial communication frequency ($f_{Ai}$) to a frequency ($f_{Aj}$) initially assigned to satellites (Aj) residing in an orthogonal orbit plane (15) of said first System (A).

6. The method as claimed in claim 5, in which said orthogonal orbit plane (15) is an inclined, orthogonal, conjugate orbit plane (15).

7. The method as claimed in claim 1, further including the step of using packet transmission store and forward protocols for said communication between said satellites of said first System (A); said plurality of ground relay stations (18) and said user terminals (20) to reduce infrequent interference between satellites in said first System (A) and said second System (B) caused by burst packet transmissions and packet re-transmissions.

8. The method as claimed in claim 3, in which the step of changing said initial communication frequency ($f_{Ai}$) assigned to one of said satellites (Ai) residing in a first one of said orbital planes (14) of said first System (A), includes the step of changing said initial communication frequency ($f_{Ai}$) to a frequency (fci) initially assigned to satellites (Ci) residing in a third System (C) in which said satellites (Ci) do not present radio interference with satellites (A1-M) in said first System (A).

9. The method as claimed in claim 1, in which the step of effecting timing of said changing said initial communication frequency ($f_{Ai}$) by using a radio-frequency use schedule (49) computed in advance from orbital ephemeris data (46) for said satellites (A1-M) in said first System (A) and satellites (B1-N) in said second System (B) includes the steps of:

listening for transmissions of satellites (B1-N) residing in said second System (B) with satellites (A1-M) residing in said first System (A); intercepting said transmissions and determining the frequency ($f_{Bp}$) of said transmissions and time to change said initial communication frequency ($f_{Ai}$);

transmitting said frequency ($f_{Bp}$) and said time determined by said satellites (A1-M) to all said satellites (A1-M) in said first System (A) and to at least one of said plurality of ground relay stations (18); and maintaining said frequency ($f_{Bp}$) and time as data in said orbital parameter ephemeris (46) and computing on board each of said satellites (A1-M) said radio frequency use schedule (49) by use of a radio frequency use schedule algorithm (48).

10. The method as claimed in claim 9, in which the step of maintaining said frequency ($f_{Bp}$) and time as data in said orbital parameter ephemeris (46) and computing said radio frequency use schedule (49), is accomplished on board each said satellite (A1-M).

11. The method as claimed in claim 9, in which the step of maintaining said frequency ($f_{Bp}$) and time as data in said orbital parameter ephemeris (46) and computing said radio frequency use schedule (49), is accomplished on the Earth (E) and furnished to each said satellite (A1-M) from one of said plurality of ground relay stations (18).

* * * * *